United States Patent [19]

Sugimori

[11] Patent Number: 4,814,417

[45] Date of Patent: Mar. 21, 1989

[54] PROCESS FOR PRODUCING A LIQUID CRYSTALLINE POLYESTER POLYMER OF A CYCLOHEXANEDICARBOXYLIC ACID AND AN AROMATIC DIOL WITH PYRIDINE/THIONYL CHLORIDE CATALYST

[75] Inventor: Shigeru Sugimori, Musashinoshi, Japan

[73] Assignee: Chisso Corporation, Osaka, Japan

[21] Appl. No.: 170,365

[22] Filed: Mar. 18, 1988

[30] Foreign Application Priority Data

Apr. 10, 1987 [JP] Japan .................................. 62-88408

[51] Int. Cl.$^4$ .............................................. C08G 63/30
[52] U.S. Cl. .................................... 528/182; 528/125; 528/126; 528/173; 528/176; 528/179; 528/190; 528/191; 528/193; 528/274
[58] Field of Search ...................... 528/182, 176, 179

[56] References Cited

U.S. PATENT DOCUMENTS

| 4,286,085 | 8/1981 | Jaquiss et al. | 528/182 |
| 4,482,694 | 11/1984 | Freitag et al. | 528/182 |
| 4,647,649 | 3/1987 | Higashi et al. | 528/182 |
| 4,720,538 | 1/1988 | Bartmann | 528/182 |

*Primary Examiner*—Harold D. Anderson
*Attorney, Agent, or Firm*—Fred Philpitt

[57] ABSTRACT

A process for directly producing liquid crystalline polymers from cyclohexanedicarboxylic acids and aromatic diols is provided. These raw materials can be converted into polyesters capable of finishing into fibers, films, etc., using the combination of thionyl chloride and pyridine as a condensing agent. In the present invention, aromatic oxycarboxylic acids can be used in combination in an optional proportion, in addition to the above two raw materials.

4 Claims, No Drawings

PROCESS FOR PRODUCING A LIQUID CRYSTALLINE POLYESTER POLYMER OF A CYCLOHEXANEDICARBOXYLIC ACID AND AN AROMATIC DIOL WITH PYRIDINE/THIONYL CHLORIDE CATALYST

BACKGROUND OF THE INVENTION

1. Field of the Invention

The present invention relates to a process for producing polyester copolymers of cyclohexanedicarboxylic acid and aromatic diols and more particularly, to a process for producing liquid crystalline copolymers thereof.

2. Brief Description of the Prior Art

In recent years, there have been demanded materials having excellent heat resistance, rigidity or chemical resistance, etc., namely, thermoplastic resins for general purpose thermoplastic resin molded articles such as fibers, films, molded articles, etc.

Aromatic polyesters (hereafter referred to as all aromatic polyesters) prepared by condensation polymerization from aromatic dicarboxylic acids and aromatic diols meet the physical requirements described above to some extent. However, the aromatic polyesters are neither soluble nor fusible as materials and involve many problems also in moldability thereof. On the other hand, copolymers prepared from polyethylene terephthalate and acetoxybenzoic acid are known as liquid crystalline polymers (later described).

That is, polymers obtained by using cyclohexanedicarboxylic acids in place of aromatic dicarboxylic acids and condensing the cyclohexanedicarboxylic acids and aromatic diols are known (Macromolecules, 1986, 19, 1789–1796). The polymers change to liquid crystalline melts in a melt state at high molecular weight and high temperatures and can be molded into very strong fibers through spinning. In order to prepare the polymers, however, aromatic diols cannot be used directly but should be once converted into the diacetates of aromatic diols, which results in uneconomical steps.

In addition, the liquid crystalline polymers described above are insufficient in view of heat resistance since their thermal deformation temperature is 70° to 80° C. Further the liquid crystalline polymers are prepared by the reaction of acid chlorides and alcohols or the ester exchange method and such a process encounters a problem that it was difficult to prepare the products having constant physical properties.

The present inventors made extensive investigations to solve the foregoing problems relating to the all aromatic polyesters or liquid crystalline polymers and find economical polyesters having good heat resistance. As a result, they have first discovered that by the use of condensing agents of thionyl chloride and pyridine in combination, polyesters could be obtained by condensation polymerization of cyclohexanedicarboxylic acids and aromatic diols, preferably further using aromatic oxycarboxylic acids in combination.

Noting that these polyesters could solve the foregoing problems of the prior art, the present invention has been accomplished.

The reaction between thionyl chloride (SOCl$_2$) and pyridine and the reaction between the reaction product and aromatic dicarboxylic acids as well as the reaction product thereof and alcohols are shown in Higashi, High Molecular Substance, vol. 35, December, page 1098, 1986 but direct polycondensation of alicyclic dicarboxylic acids and aromatic diols is not disclosed therein.

SUMMARY OF THE INVENTION

An object of the present invention is to provide a process for producing polyester polymers which are free from the foregoing problems in the prior art.

Another object of the present invention is to provide a process for producing polyester polymers having excellent heat and chemical resistance and high rigidity.

A further object of the present invention is to provide a process for directly producing polyester polymers of cyclohexanedicarboxylic acids and aromatic diols, without once acetoxylating the aromatic diols.

A still further object of the present invention is to provide a process for producing liquid crystalline polyester polymers having excellent moldability.

The above objects can be achieved by a process for producing polyester polymers which comprises condensing cyclohexanedicarboxylic acids and aromatic diols using a condensing agent of thionyl chloride and pyridine in combination.

DETAILED DESCRIPTION OF THE INVENTION

The present invention comprises the main construction (1), with embodiments (2) to (4) described below.

(1) A process for producing a polyester polymer which comprises condensing a cyclohexanedicarboxylic acid and an aromatic diol using a condensing agent of thionyl chloride and pyridine in combination.

(2) A process according to (1) wherein an aromatic oxycarboxylic acid is condensed in combination.

(3) A process according to (1) wherein trans- or cis-1,4 cyclohexanedicarboxylic acid is used as the cyclohexanedicarboxylic acid.

(4) A process according to (1) wherein hydroquinone, methylhydroquinone, chlorohydroquinone, phenylhydroquinone or bisphenol A is used as the aromatic diol.

The construction and effects of the present invention will be described below in detail.

The major constituent raw materials of the liquid crystalline polyester polymers of cyclohexanedicarboxylic acids and aromatic diols in the present invention (hereafter sometimes referred to as the liquid crystalline polyester polymers of the present invention) are cyclohexanedicarboxylic acids and aromatic diols. In addition to the cyclohexanedicarboxylic acids and aromatic diols, aromatic oxycarboxylic acids can also be used in combination in an optional proportion.

As the cyclohexanedicarboxylic acid, trans- or cis-1,2-cyclohexanedicarboxylic acid, trans- or cis-1,3-cyclohexanedicarboxylic acid and trans- or cis-1,4-cyclohexanedicarboxylic acid are preferably used, though they are not limitative.

The cyclohexanedicarboxylic acids maintain preferably a structure represented by general formula (A) described below in the polymer in accordance with the present invention:

wherein $R^1$ represents a trans- or cis-divalent hexylene group.

The diols which are used in the present invention maintain preferably a structure represented by general formula (B) described below in the polymer in accordance with the present invention:

$$-O-R^2-O- \qquad (B)$$

wherein $R^2$ represents a divalent aromatic group, $R^4-X^1-R^5$; $R^4$ and $R^5$ are a divalent aromatic group; $X^1$ represents an oxygen atom, a sulfur atom, a sulfonyl group, a carbonyl group, an alkylene group, an alkylidene group or an ester group, or a direct bond between $R^4$ and $R^5$. Further the hydrogen atom on the aromatic ring for $R^2$, $R^3$ (later described), $R^4$ and $R^5$ may be substituted with a halogen, a hydrocarbon group, an alkoxy group, a phenyl group or a phenoxy group. As the diols, any of those having a structure which is represented by general formula (B) described above wherein H atoms are added to the both ends thereof may be usable. Specific examples include hydroquinone, resorcine, methylhydroquinone, chlorohydroquinone, acetylhydroquinone, acetoxyhydroquinone, nitrohydroquinone, dimethylaminohydroquinone, 1,4-dihydroxynaphthol, 1,5-dihydroxynaphthol, 1,6-dihydroxynaphthol, 2,6-dihydroxynaphthol, 2,7-dihydroxynaphthol, 2,2'-bis(4-hydroxyphenyl)propane, 2,2'-bis(4-hydroxy-3,5-dimethylphenyl)propane, 2,2'-bis(4-hydroxy-3,5-dichlorophenyl)propane, 2,2'-bis(4-hydroxy-3-methylphenyl)propane, 2,2'-bis(4-hydroxy-3-metylphenyl)propane, 2,2'-bis(4-hydroxy-3-chlorophenyl)propane, bis(4-hydroxyphenyl)methane, bis(4-hydroxy-3,5-dimethylphenyl)methane, bis(4-hydroxy-3,5-dichlorophenyl)methane, bis(4-hydroxy-3,5-dibromophenyl)methane, 1,1-bis(4-hydroxyphenyl)cyclohexane, 4,4'-dihydroxydiphenylbis(4-hydroxyphenyl)-ketone, bis(4-hydroxy-3,5-dimethylphenyl)-ketone, bis(4-hydroxy-3,5-dichlorophenyl)-ketone, bis(4-hydroxyphenyl)sulfide, bis(4-hydroxy-3-chlorophenyl)sulfide, bis(4-hydroxyphenyl)sulfone, bis(4-hydroxy-3,5-dichlorophenyl)ehter, 1,4-butanediol, 1,4-cyclohexanediol, 1,6-hexamethylenediol, 1,4-cyclohexanedimethanol, xylydene-1,4-diol, 1,3-cyclohexanediol, etc. but the aromatic diols are not necessarily limited thereto. They may also be used as an admixture thereof.

The oxycarboxylic acids described above maintain preferably a structure represented by general formula (C) described below in the polymer in accordance with the present invention:

$$-O-R^3-\underset{\underset{O}{\|}}{C}- \qquad (C)$$

wherein $R^3$ represents a divalent aromatic group.

Specific examples include p- or m-hydroxybenzoic acid, syringic acid, vanillic acid, 4-hydroxy-4'-carboxydiphenyl ether, 4-hydroxy-4'-carboxybiphenyl, 2,6-dichloro-p-hydroxybenzoic acid, 2-chloro-p-hydroxybenzoic acid, 2,6-difluoro-p-hydroxybenzoic acid, 2-hydroxy-6-napthoic acid, 2-hydroxy-3-napthoic acid, 1-hydroxy-4-napthoic acid, etc. These may be used singly or as an admixture thereof.

As the oxycarboxylic acids, any of those represented by general formula (C) is usable and specific examples are p-hydroxybenzoic acid, m-hydroxybenzoic acid, syringic acid, vanillic acid, 4-hydroxy-4'-carboxydiphenyl ether, 4-hydroxy-4'-carboxybiphenyl, 2,6-dichloro-p-hydroxybenzoic acid, 2-chloro-p-hydroxybenzoic acid, 2,6-difluoro-p-hydroxybenzoic acid, 2-hydroxy-6-napthoic acid, 2-hydroxy-3-napthoic acid, 1-hydroxy-4-napthoic acid, 4-hydroxylcyclohexanecarboxylic acid, 3-hydroxylcyclohexanecarboxylic acid, β-hydroxyethanol, ω-hydroxycaproic acid, etc. These may also be an admixture thereof.

Firstly, in case that the polymer of the present invention is produced only from two of the cyclohexanedicarboxylic acid and the aromatic diol, the structure of general formula (A) to the structure of general formula (B) in the copolymer becomes 50:50 by mol% as the result.

Next, in case that the copolymer of the present invention is produced using the aromatic oxycarboxylic acids, in addition to the cyclohexanedicarboxylic acid and the aromatic diol, mol% of the structural part of general formula (C) in the copolymer is not formally limited to the mol% that the structures of general formulae (A) and (B) occupy. In order to obtain the polymer having preferred physical properties aimed by the present invention, however, it is preferred that the mol% of (A):(C) (note: the same as in the mol% of (B):(C)) be 100 to 5:0 to 95. When (A):(C) is 5:95, the structural units (A), (B) and (C) in the polymer become 4.77:4.77:90.46 (mol%) but when the ratio of (A) to (B) is less than the lower limit, the characteristic (liquid crystalline property upon melting) of the polymer in accordance with the present invention is reduced. A molecular weight of the polymer in accordance with the present invention is not limited but it is desired that a logarithmic viscosity ($\eta$inh) be not less than 0.1 dl/g when measured by the following method.

The logarithmic viscosity the copolymer is measured at 0.5 g/dl and 50° C. in p-chlorophenol. When the logarithmic viscosity is less than 0.1 dl/g, the copolymer exhibits a sufficient strength as molding materials only with difficulty.

The process of the present invention is illustratively explained below.

Firstly, the condensing agent in combination is prepared. A definite amount of thionyl chloride is charged in a reactor (equipped with a nitrogen introducing tube, a cooling condenser and a dropping funnel) and a definite amount of pyridine is then dropwise added thereto under ice cooling. A proportion of thionyl chloride to pyridine used and a dropping time of pyridine are not limited but it is preferred that pyridine be used in 0.01 to 100 mols, preferably 0.1 to 10 mols, based on 1 mol of thionyl chloride and dropwise added over a minute to 2 hours, preferably 3 to 30 minutes.

After maintaining the reaction mixture at about 0° C. for 10 minutes to 2 hours, for example, 30 minutes, raw materials in accordance with the present invention, namely, the cyclohexanedicarboxylic acid, aromatic diol and, if necessary, a solution obtained by separately dissolving the aromatic oxycarboxylic acid in pyridine are added to the reaction mixture. A ratio of each raw material to pyridine is not limited but it is easy to perform when a ratio of g of the raw material/ml of pyridine is not greater than 0.1, preferably about 0.05 to about 0.01. The order of adding each raw material and a time period for addition are not limited but two or three kinds of raw materials are added sequentially or simultaneously over 5 minutes to 2 hours, preferably 10 minutes to an hour. After completion of the addition, the temperature of the reaction mixture is elevated to room temperature. After stirring, for example, for 30 minutes, the system is heated at a reaction temperature (80° to 120° C.) for 2 to 2 hours, for example, 5 hours to proceed the condensation. After completion of the condensation, the reaction mixture is reverted to normal temperature and poured into a non-solvent (methanol) at room temperature. The formed precipitates are filtered and taken out by suction and further boiled to reflux in a non-solvent and subsequently filtered and dried to give the objective polyester. In the case of using the three raw materials described above, configuration of the monomers in the obtained polyester copolymer is at random but the configuration of monomers in the polyester copolymer obtained by adding raw materials used to the reaction mixture stepwise can be controlled, which is similar to the case of "Synthesis of high molecular polyesters using thionyl chloride/pyridine" previously published by the present inventors (Higashi, Sugimori and Mashita, Preview of Meeting of the High Molecular Society, 35, 275, 1986).

Namely, by using the aforesaid 3 raw materials resulting in the structures (A), (B) and (C) described above in an appropriate combination with the thionyl chloride-pyridine condensing agent and performing polymerization stepwise, copolymers having a logarithmic viscosity ($\eta$inh) higher than in those obtained by adding and polymerizing all of the raw materials simultaneously can be obtained.

According to the process of the present invention, there can be easily obtained binary or ternary copolymers of alicyclic polyesters having heat or chemical resistance and high rigidity comprising structural units represented by general formulae (A) and (B) or (A), (B) and (C) described above, having a composition wherein (A):(B) is 50:50 in the former and in the latter, (A):(C) is 100:0 to 5:95, in a molar ratio (note: when the structural unit (C) is zero, the molar ratio is identical with the former one) and having a logarithmic viscosity ($\eta$inh) of not less than 0.1 dl/g when measured at 0.5 g/dl and 50° C. in p-chlorophenol. Further according to the process of the present invention, the aromatic diols represented by general formula (B) described above can be reacted directly with the alicyclic dicarboxylic acids represented by general formula (A) described above, without once acetoxylating the aromatic diols and therefore, the present invention can provide an industrially advantageous process.

Furthermore, the compounds in accordance with the present invention show a melting point or glass transition point at 160° C. or higher and most of them exhibit liquid crystalline properties.

Hereafter the present invention will be described with reference to the examples below.

EXAMPLE 1

Production of poly(p-phenylene-trans-1,4-cyclohexanedicarboxylate)

In a 3-necked flask reactor equipped with a nitrogen introducing tube, a cooling condenser and a dropping funnel was charged 1.31 g (11 mmols) of thionyl chloride. Next, nitrogen was flown through the nitrogen introducing tube and ice cooled. While stirring 10 ml of pyridine was added through the dropping funnel over 10 minutes.

After stirring for 30 minutes, a solution of 0.5506 g (5 mmols) of hydroquinone and 0.8610 g (5 mmols) of trans-1,4-cyclohexanedicarboxylic acid in 20 ml of pyridine was added to the mixture over 20 minutes. After stirring at room temperature for 30 minutes, the reaction was carried out at 80° C. for 5 hours.

After completion of the reaction, the reaction solution described above was poured into 150 ml of methanol. After the formed precipitates were filtered and taken out by suction, the solid was further boiled to reflux for an hour together with 100 ml of methanol. The solid after reflux was filtered by suction to give a polymer having a logarithmic viscosity ($\eta$inh) of 0.74 dl/g.

EXAMPLES 2 THROUGH 5

Procedures were conducted in a manner similar to Example 1 except that other diols were used, respectively, in place of hydroquinone.

The diols (bisphenol) used and the results (physical properties of polymer) are shown in Table 1.

TABLE 1

| Example No. | Bisphenol | $\eta$ inh | m.p. (C-LC) |
| --- | --- | --- | --- |
| 2 | Methylhydroquinone | 1.50 | 230–260 |
| 3 | Chlorohydroquinone | 1.86 | 255–280 |
| 4 | Phenylhydroquinone | 2.26 | 250–280 |
| 5 | Bisphenol A | 0.81 | |

Note:
(C-LC) indicates a temperature range of liquid crystal (same as in the following tables).

EXAMPLE 6

Production of poly(chloro-1,4-phenylene-cis-1,4-cyclohexanedicarboxylate)

Procedures were conducted in a manner similar to Example 1 except that cis-1,4-cyclohexanedicarboxylic acid and chlorohydroquinone were used in place of trans-1,4-cyclohexanedicarboxylic acid and hydroquinone, respectively. A logarithmic viscosity ($\eta$inh) and a melting point of the obtained polymer were 0.41 and 190° to 230° C., respectively.

EXAMPLE 7

Procedures were conducted in a manner similar to Example 1 except that 0.2753 g (2.5 mmols) of hydroquinone and a solution of 0.4305 g (2.5 mmols) of trans-1,4-cyclohexanedicarboxylic acid and 0.6907 g (5 mmols) of p-hydroxybenzoic acid in 20 ml of pyridine were used in place of trans-1,4-cyclohexanedicarboxylic acid and hydroquinone, respectively. A logarithmic viscosity of the obtained polymer was 2.10.

EXAMPLES 8 THROUGH 21

Compounds were produced in a manner quite similar to Example 7 except that 0.3104 g (2.5 mmols) of methylhydroquinone, 0.4655 g (2.5 mmols) of phenylhydroquinone, 0.3614 g (2.5 mmols) of chlorohydroquinone or 0.5708 g (2.5 mmols) of bisphenol A was used in place of hydroquinone; 0.4305 g (2.5 mmols) of trans- or cis-1,4-cyclohexanedicarboxylic acid was used as a component corresponding to trans-1,4-cyclohexanedicarboxylic acid; and 0.6907 g (5 mmols) of p- or m-hydroxybenzoic acid, 0.8407 g (5 mmols) of vanillic acid or 0.8407 g (5 mmols) of syringic acid was used as a component corresponding to p-hydroxybenzoic acid, respectively. The results are shown in Table 2.

TABLE 2

| Example No. | —Cyclo-hexane-dicarboxylic Acid | Phenols | p- or m-Hydroxy-benzoic Acid and Others | η inh | m.p. or C-LC |
|---|---|---|---|---|---|
| 7 | trans- | Hydroquinone | p- | 2.10 | |
| 8 | " | Hydroquinone | m- | 0.44 | 150–210 |
| 9 | " | Methylhydroquinone | p- | 2.90 | 240–270 |
| 10 | " | Methylhydroquinone | " | 3.65[(1)] | |
| 11 | " | Methylhydroquinone | " | 4.20[(2)] | |
| 12 | cis- | Methylhydroquinone | p- | 0.44 | 155–210 |
| 13 | trans- | Methylhydroquinone | Vanillic acid | 1.34 | 240–270 |
| 14 | " | Methylhydroquinone | Syringic acid | 1.46 | 230–270 |
| 15 | " | Methylhydroquinone | m- | 1.01 | 190–250 |
| 16 | trans- | Chlorohydroquinone | p- | 2.94 | |
| 17 | " | Chlorohydroquinone | m- | 1.05 | 240–270 |
| 18 | " | Chlorohydroquinone | Syringic acid | 1.17 | |
| 19 | trans- | Bisphenol A | p- | 1.09 | 235–275 |
| 20 | Trans- | Phenylhydroquinone | p- | 2.71 | 210–330 |
| 21 | " | Phenylhydroquinone | m- | 1.14 | 225–260 |

Notes:
[(1)]reaction temperature, 100° C.
[(2)]reaction temperature, 200° C.

EXAMPLES 22 THROUGH 30

Procedures were conducted in a manner similar to Example 1 except that trans-1,4-cyclohexanedicarboxylic acid and cis-1,4-cyclohexanedicarboxylic acid were used in combination in various proportions in place of trans-1,4-cyclohexanedicarboxylic acid. The results are shown in Table 3.

TABLE 3

| Example No. | Cyclohexane-dicarboxylic Acid, trans mmol/cis mmol | Hydroquinone | η inh | m.p. or C-LC |
|---|---|---|---|---|
| 22 | 2.5/2.5 | Methylhydroquinone | 0.51 | 130–175 |
| 23 | 2.0/3.0 | " | 0.40 | |
| 24 | 1.75/3.25 | " | 0.37 | |
| 25 | 1.25/3.75 | " | 0.43 | 140–175 |
| 26 | 2.5/2.5 | Chlorohydroquinone | 0.95 | |
| 27 | 1.5/3.5 | " | 0.69 | |
| 28 | 3.75/1.25 | Phenylhydroquinone | 0.83 | 190–230 |
| 29 | 2.5/2.5 | " | 0.51 | 190–220 |
| 30 | 1.25/3.75 | " | 0.36 | 170–210 |

EXAMPLES 31 THROUGH 33

Procedures were conducted in a manner similar to Example 1 except that methylhydroquinone and chlorohydroquinone in combination in various proportions were used in 5 mmols in total, in place of hydroquinone (5 mmols). The results are shown in Table 4.

TABLE 4

| Example No. | Methylhydroquinone/Chlorohydroquinone mmol/mmol | η inh | m.p. or C-LC |
|---|---|---|---|
| 31 | 4.0/1.0 | 2.42 | 240–280 |
| 32 | 2.5/2.5 | 2.33 | |
| 33 | 1.0/4.0 | 1.82 | 190–290 |

EXAMPLES 34 THROUGH 36

Polymerization was carried out in a manner similar to Example 7 except that trans-1,4-cyclohexanedicarboxylic acid (2.5 to 1.25 mmols) and isophthalic acid or terephthalic acid (0 or 1.25 mmols) were used in place of trans-1,4-cyclohexanedicarboxylic acid (2.5 mmols) and p-hydroxybenzoic acid (2.5 mmols) and m-hydroxybenzoic acid (2.5 mmols) or p-hydroxybenzoic acid (5 mmols) and methylhydroquinone (2.5 mmols) were used in place of p-hydroxybenzoic acid (5 mmols). The results are shown in Table 5.

TABLE 5

| Example No. | Dicarboxylic Acid mmol/mmol | Oxycarboxylic Acid mmol/mmol | η inh | m.p. or C-LC |
|---|---|---|---|---|
| 34 | A2.5 | D2.5/E2.5 | 1.69 | 180–230 |
| 35 | A1.25/B1.25 | D5.0 | 1.88 | 220–260 |
| 36 | A1.25/C1.25 | D5.0 | 1.51 | 180–210 |

Notes:
A: trans-1,4-cyclohexanedicarboxylic acid
B: isophthalic acid
C: terephthalic acid
D: p-hydroxybenzoic acid
E: m-hydroxybenzoic acid

EXAMPLE 37 (stepwise reaction)

In a 3-necked flask reactor equipped with a nitrogen introducing tube, a cooling condenser and a dropping funnel was charged 1.31 g (11 mmols) of thionyl chloride. Next, nitrogen was glown through the nitrogen introducing tube and ice cooled. While stirring 10 ml of pyridine was added through the dropping funnel over 10 minutes.

After stirring for 30 minutes, a solution of 0.4305 g (2.5 mmols) of trans-1,4-cyclohexanedicarboxylic acid and 0.6907 g (5 mmols) of p-hydroxybenzoic acid in 10 ml of pyridine was added to the mixture over 10 minutes. Subsequently, the reaction mixture was stirred for 20 minutes under ice cooling. (The foregoing step is made "first step activation".)

A solution of methylhydroquinone (2.5 mmols) in 10 ml of pyridine was added to the aforesaid reaction mixture over 10 minutes. (The foregoing step is made "second step activation".) The reaction mixture after the second step activation was reacted at room temperature for 30 minutes and then reacted at 80° C. for 5 hours.

Procedures after completion of the reaction described above were conducted in a manner similar to Example 1 to give a polymer having a logarithmic viscosity (ηinh) of 3.24 dl/g and a melting point (m.p.) of 240°–275° C.

EXAMPLES 38 THROUGH 46

Stepwise activation reaction was carried out in a manner similar to Example 37 except for using a number of carboxylic acids, hydroquinones and oxyacids in combination. Conditions for the production and the results are shown in Table 6.

TABLE 6

| Example No. | First Step Activation Reaction mmol/mmol | Second Step Activation Reaction mmol | Third Step Activation Reaction mmol | η inh | m.p. or C-LC |
|---|---|---|---|---|---|
| 38 | A2.5/B2.5 | C5 | — | 2.74 | 240–275 |
| 39 | A2.5 | C5/B5 | — | 3.22 | 190–215 |
| 40 | A2.5/C5 | D2.5 | — | 1.75 | 190–210 |
| 41 | A2.5 | C5 | D2.5 | 1.92 | |
| 42 | A2.5 | C5 | — | 1.60 | 170–210 |
| 43 | A2/B2 | F3/B3 | — | 0.44 | |
| 44 | A2/B5 | F3 | — | 0.41 | |
| 45 | A2.5/E2.5 | F2.5/E2.5 | — | 1.05 | |
| 46 | F2.5/E5 | A2.5 | — | 0.78 | |

Notes:
A: trans-1,4-cyclohexanedicarboxylic acid
B: methylhydroquinone
C: p-hydroxybenzoic acid
D: phenylhydroquinone
E: chlorohydroquinone
F: cis-1,4-cyclohexanedicarboxylic acid While the invention has been described in detail and with reference to specific embodiments thereof, it will be apparent to one skilled in the art that various changes and modifications can be made therein without departing from the spirit and scope thereof.

What is claimed is:

1. A process for producing a polyester polymer which comprises condensing a cyclohexanedicarboxylic acid and an aromatic diol with a condensing agent of thionyl chloride and pyridine in combination.

2. A process according to claim 1 wherein an aromatic oxycarboxylic acid is condensed in combination.

3. A process according to claim 1 wherein trans- or cis-cyclohexanedicarboxylic acid is said cyclohexanedicarboxylic acid.

4. A process according to claim 1 wherein hydroquinone, methylhydroquinone, chlorohydroquinone, phenylhyroquinone or bisphenol A is said aromatic diol.

* * * * *